April 5, 1966
D. B. HERRERA
3,244,079
SAFETY BRAKE
Filed Aug. 15, 1963
3 Sheets-Sheet 1
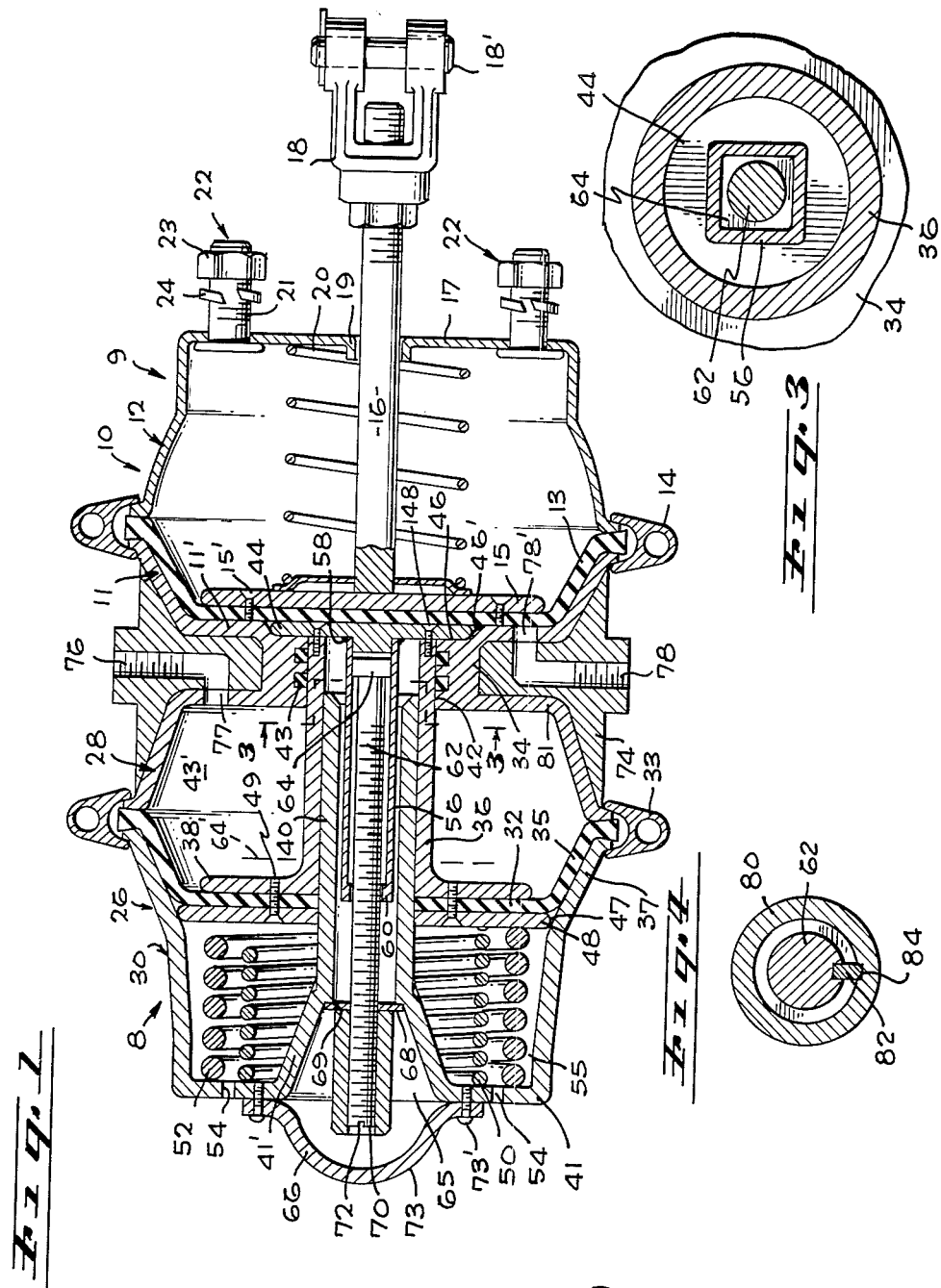
Dan B. Herrera
INVENTOR
BY Philip Subkow
ATTORNEY

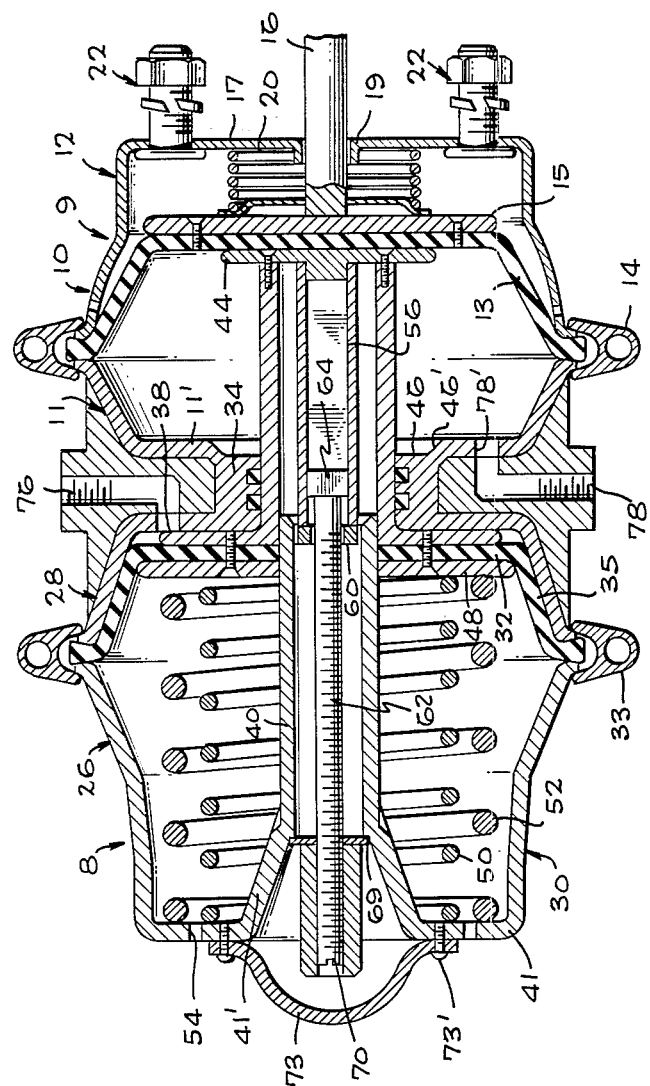

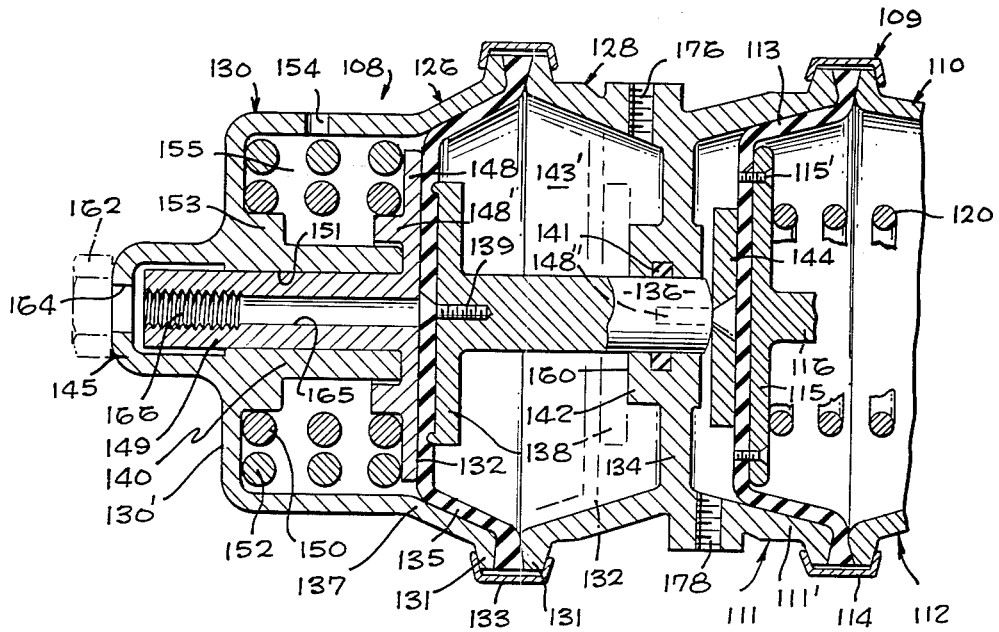

United States Patent Office 3,244,079
Patented Apr. 5, 1966

3,244,079
SAFETY BRAKE
Dan B. Herrera, Cudahy, Calif. (% Stratovalve & Engineering Co., 2544 E. 52nd St., Huntington Park, Calif.)
Filed Aug. 15, 1963, Ser. No. 302,324
5 Claims. (Cl. 92—63)

This application is a continuation-in-part of my copending application Serial No. 90,797, filed February 21, 1961, now Patent No. 3,101,219.

This invention relates to brake mechanism for vehicles, and more particularly relates to fluid pressure, e.g. air pressure, operated vehicle brakes, incorporating a safety mechanism which does not require fluid pressure for operation and which can be automatically applied as a parking brake and particularly as an emergency brake to provide safe stops in the event of a reduction of fluid pressure.

One object of the invention is the provision of an improved auxiliary brake mechanism employed in conjunction with the conventional brake applying structure.

A further object is to provide a safety mechanism in combination with the conventional fluid pressure brake, which mechanism embodies a diaphragm and associated plunger arrangement, and employs a spring as the actuating means, said spring being normally rendered ineffective by the fluid pressure, but is actuated when the fluid pressure fails or is reduced, and which further incorporates a novel and simple guide means to maintain the diaphragm and plunger arrangement properly centered particularly during actuation thereof.

Yet another object is to afford an improved auxiliary brake structure which is readily constructed, is reliable, durable, and economically competitive.

Other objects and advantages will be apparent hereinafter.

The invention comprises in combination with the conventional fluid pressure operated brake, an automatically operated safety or parking brake mechanism, normally subjected to the same air pressure as employed for operating the brake. This air pressure is sufficient to maintain the auxiliary safety mechanism in its inoperative position. In the event of failure of the compressed air supply or a serious reduction in pressure below a preselected value, a spring mechanism automatically operates to apply the brake and to hold it in the applied position until such time as the air pressure is again built up to its normal amount. When the vehicle is parked and the air pressure is reduced or turned off entirely, the auxiliary mechanism operates automatically to apply the brakes until the air pressure is again brought up to the desired extent. Further, when the vehicle is in operation and moving, if a leakage develops in the fluid pressure line and the air pressure drops below a predetermined minimum, the auxiliary mechanism automatically applies the brake, thus acting as a safety feature.

The auxiliary mechanism comprises a reciprocable member or plunger which is actuated in response to motion of a diaphragm produced by a compression spring against one side of the diaphragm. Normally, the same fluid pressure which operates the brake is applied against the other side of said diaphragm and maintains the spring under compression and inoperative. On a reduction or failure of this fluid pressure, the spring causes displacement of the daphragm and plunger, and movement of the latter cooperates with the conventional brake mechanism including the brake rod, to apply the brake.

An important feature of the invention resides in the incorporation in the auxiliary mechanism, of guide means to maintain the diaphragm and plunger in a true centered axial relation as the diaphragm and associated plunger are displaced in either direction, and substantially avoiding undesirable lateral wobbling of the plunger, and unsymmetrical motion of the diaphragm in operation.

According to one embodiment, a hollow plunger is provided which is attached to the diaphragm, and a guide member supported at the rear of the chamber extends axially into the chamber. The plunger is mounted for slidable axial movement on the guide member in response to motion of the diaphragm, and the diaphragm is centrally apertured to receive the fixed guide member and to permit axial motion of the diaphragm, together with the plunger, on the guide member.

In another embodiment of the invention, the guide member extends axially only a short distance into the chamber and terminates on the opposite side of the diaphragm from that on which the plunger is positioned. The guide member is hollow and receives for slidable motion therein a follower having a plate mounted on its forward end, said plate contacting the rear of the diaphragm. One side of the spring is compressed against said plate. On reciprocable motion of the diaphragm and plunger, the follower plate and its attached follower are moved axially, and the follower, which is guided during axial motion by the guide member, maintains the assembly including the plunger and diaphragm, in axial alignment, substantially avoiding any undesirable lateral motion of such assembly.

Means are also provided for resetting or for inactivating the auxiliary brake mechanism, preferably employing a screw mechanism for this purpose.

The invention will be more clearly understood by reference to the description below of certain embodiments of the invention taken in connection with the accompanying drawings wherein FIG. 1 is a longitudinal section through one embodiment the device, showing the device in its inoperative position;

FIG. 2 is a view similar to FIG. 1, showing the device in its operative position;

FIG. 3 is a section taken on line 3—3 of FIG. 1;

FIG. 4 shows a modification of a detail of the device of FIG. 1;

FIG. 5 is a longitudinal section of a modification of the device shown in FIGS. 1 to 4; and FIG. 6 illustrates a modified form of the device of FIG. 5.

Referring to the drawings, each of the brake units is formed of two portions, namely the main air brake 9 which is a conventional unit, in combination with the auxiliary unit 8, which incorporates the novel mechanism of the invention. The brake unit 9 comprises an air brake cylinder 10 which is formed of two parts 11 and 12, each part being outwardly flanged to clamp between the flanges of these parts a rubber diaphragm 13. An annular band 14 is crimped over the flange portions of the cylinder parts for securing them in place.

The diaphragm 13 in its normal relaxed position is in the position shown in FIG. 1 wherein it contacts the rear wall portion 11' of the part 11. A brake rod 16 carries at its inner end a plate 15 which is connected to diaphragm 13 by screws 15'. The plate 15 and diaphragm 13 are normally urged to the left, as seen in FIG. 1 by means of a compression spring 20 which is seated at one end against the plate 15 and at the other end against the wall of the front plate 17 of part 12. In this rearwardmost position of the diaphragm 13, it is in a relaxed condition. The brake rod 16 extends through a bearing 19 in front wall 17 and is threadably connected at its forward end to a clevis 18 which is pivoted at 18' on a conventional brake arm (not shown). Displacement of the brake rod 16 to the right as viewed in FIG. 1 will cause a displacement of pin 18' and a consequent rocking motion of the brake arm in a manner as is well understood, to apply the brake. Actuation of the brake is accomplished by the introduction of fluid pressure through inlet 78 and port 78' of wall 11', into the brake cylinder 10, causing displacement of the diaphragm 13 toward the front of the cylinder 10 against the action of the compression spring 20. The diaphragm 13 can be urged to any desired extent toward the front of the cylinder 10 to apply whatever pressure is needed to operate the brake. In its fully distended position the diaphragm 13 takes a forward position indicated in FIG. 2 of the drawing. Fasteners or clamping units 22 are provided on the front wall 17 of the air cylinder 10 for attachment of the unit to the frame of the vehicle. Such units each comprise a threaded bolt 21, a nut 23 and a spring washer 24.

The auxiliary unit 8 is in the form of a cylinder 26 comprising a front part 28 and a rear part 30. The parts 28 and 30 are flanged to clamp therebetween a second rubber diaphragm 32 at its periphery employing an annular band 33 crimped over the flange portions of the cylinder parts to secure same in place. In the position of the dished diaphragm 32 shown in FIG. 1 the angular side wall 35 thereof is in abutting relation with a wall portion 37 of the cylinder part 30 as seen in FIG. 1. It is noted that the units 8 and 9 are interconnected by an integral collar 34.

The diaphragm 32 is mounted for axial displacement of a plunger 36 in response to motion of such diaphragm, said plunger being positioned centrally of the diaphragm. The plunger 36 carries at its rear an integral flange 38 or pressure plate, the central portion of the diaphragm 32 being clamped between flange 38 and an outer plate 48 by screws 49. A fixed hollow cylindrical guide 40 is mounted centrally within the auxilary cylinder 26 and is integrally connected to a rearwardly extending outwardly flared conical wall 41' integral with a rear wall portion 41 of the cylindrical part 30. The plunger 36 is mounted for slidable movement on the guide 40, carrying with it during such movement the diaphragm 32 and the plate 48 connected to the opposite side of such diaphragm. Both the diaphragm 32 and plate 48 are centrally apertured to receive the guide 40. The inner surface 42 of the collar 34 serves as a central bearing for the plunger 36 and the O-ring seals 43 are provided in the collar 34 to render the interior 43' of the forward portion 28 of auxiliary cylinder 26 fluid-tight. In the inoperative position of the diaphragm 32 shown in FIG. 1 the outer periphery of the plate 48 cams against the adjacent inner wall of part 30, as indicated at 47, and thus prevents any rearward strain on or bulging of the diaphragm as a result of the introduction of fluid pressure into the interior 43' of cylinder 26, as will be described hereinafter.

In the position shown in FIG. 1, the forward end of the plunger 36 extends just to the forward end of the cylinder 28, that is, to the front end of collar 34. The end of plunger 36 carries a plate 44 which is connected to the plunger by means of screws 148. The plate 44 seats in a recess 46 formed at the inner end of the brake cylinder 10, such recess being provided by the angular neck portion 46' which connects the part 11 of cylinder 10 with the collar 34 of the auxiliary cylinder 26. It will be seen that the plate 44 abuts the central portion of the diaphragm 13 when the latter is in the relaxed non-brake applying position shown in FIG. 1. Hence it will be seen that movement of plunger 36 to the right as viewed in FIG. 1 will cause plate 44 to displace the diaphragm 13 in the same direction against the action of spring 20 to apply a braking force to the brake rod 16. Such movement of the plunger 36 is brought about by the provision of a pair of concentrically arranged compression springs 50 and 52 positioned in the rear portion of the cylinder part 30 and seated between the rear wall 41 of such part and the plate 48. In the normal non-operative position of the auxiliary mechanism shown in FIG. 1, the springs 50 and 52 are maintained under compression by fluid pressure within chamber 43' of the cylinder 26. Holes 54 are provided in the rear wall 41 of the cylinder part 30 to maintain the chamber 55 in which springs 50 and 52 are located, under atmospheric pressure.

A sleeve 56 having a square cross section as seen in FIG. 3, is mounted centrally on the plate 44 by means of welding as at 58, and extends into the cylindrical guide cylinder 40, but spaced from the inside wall thereof. The sleeve 56 carries a collar 60 at its inner end, and a screw 62 is centrally positioned within the sleeve 56 and is received within collar 60 with sufficient clearance to permit axial movement of the screw with respect to the collar. The screw 62 carries a head 64 at its outer end, such head having a square cross section as seen in FIG. 3, and mating with the interior surface contour of the sleeve 56. Hence it is seen that the screw 62 is maintained in non-rotatable position by virtue of the mating of the head 64 with the interior contour of the sleeve 56, thus locking the screw against rotation, the head 64, however, being in axially slidable relation with the interior of the sleeve 56, and thus permitting axial motion of screw 62 with respect to sleeve 56.

An actuating nut 66 is threadably engaged on the outer end of screw 62 and is positioned in the funnel shaped chamber 65 at the outer end of part 26, formed by the outwardly flared conical wall portion 41', with sufficient clearance between nut 66 and the adjacent wall portion 41' to permit manipulation of the nut with the fingers. At its inner end the nut 66 cams against a plate or washer 68 mounted on the screw 62, and which abuts a shoulder 69 formed at the rear surface of the fixed guide member 40. It will be seen that rotation of the nut 66 will cause axial displacement of the screw 62 within the sleeve 56 in one direction or the other, depending on the direction of rotation of the nut. A lock screw 70 is arranged to be threadably received within the nut 66 adjacent the outer end of screw 62. Lock nut 70 functions to maintain the screw in a fixed preselected position without any axial motion or vibration of the screw. Nut 70 can be removed by means of a tool engaged in a notch 72, when it is desired to actuate the nut 66 for setting the screw 62 in a selected axial position. A removable cover 73 is mounted over the outer end of screw 62, and is connected to the end wall 41 of unit 8 by means of screws 73'.

A fitting 74 is positioned around the collar 34 and fits between the adjacent outer walls of the rear part 11 of the brake cylinder 10, and the front part 28 of the auxiliary cylinder 26. A fluid pressure inlet 78 is provided on one side of the fitting 74 for introduction of fluid pressure via port 78' into the rear portion of the brake cylinder 10 and adjacent the rear face of diaphragm 13, and another fluid pressure inlet 76 is provided in the opposite side of the fitting 74 for introduction of fluid pressure via port 77 into the interior 43' at the forward portion 28 of the auxiliary cylinder 26. The fluid pressure inlets 76 and 78 are connected to the same fluid pressure reservoir in the vehicle (not shown). However, the air pressure introduced via inlet 76 to the auxiliary chamber 26 can be operated by means of a manual control in the vehicle cab, independently of the pedal or other control which introduces air pressure into the braking cylinder 10 via inlet 78, for normal operation of the brake.

Thus, in normal operation of the vehicle, the manually operated control for the fluid pressure to the auxiliary cylinder 26 is set by the operator to introduce fluid pressure from the reservoir through inlet 76 into the forward portion of the auxiliary chamber 26, to maintain the diaphragm 32 in its rearward relaxed position shown in FIG. 1 against the action of the springs 50 and 52. Whenever it is desired to apply the brake in normal operation of the vehicle, fluid pressure from the same source is introduced via inlet 78 into the rear portion of the brake chamber 10. This causes displacement of the diaphragm forwardly against the action of spring 20 to apply the desired braking force. On removal of such fluid pressure the diaphragm 13 in the brake cylinder again is urged back to its normal position by the spring 20, also carrying the brake rod 16 to the left to remove braking pressure.

In the event that there is a failure of the air pressure when the operator applies the brake in the usual manner, the reduction of air pressure in chamber 43′ in the forward portion of the auxiliary chamber 26 will cause the springs 50 and 52 to expand carrying the diaphragm 32, plunger 36 and plate 44 to the right as shown in FIG. 2. The consequent movement of the plate 44 of the plunger forward into the brake cylinder 10 urges the diaphragm 13 forward against the action of spring 20 thus carrying the brake rod 16 forward and applying braking pressure to the desired extent until the vehicle is brought under control or to a stop. At this point the parts are in the position shown in FIG. 2 of the drawing with the diaphragm 32 of the auxiliary chamber extended to a forward position and the diaphragm 13 of the brake chamber likewise extended to a forward position.

It will be seen that during forward movement of the plunger 36, the sleeve 56 likewise moves in the same direction, carrying the collar 60 to a position adjacent head 64 of the screw. The maximum forward movement of the plunger and diaphragm 32 and consequently diaphragm 13, will occur when the flange 38 strikes the inner surface of the forward wall portion 81 of the part 28.

It will be noted that due to slidable engagement of the plunger 36 on the axially positioned guide member 40, the plunger and the associated diaphragm 32 and plates 44 and 48 are maintained in a true centered axial position during forward motion of such plunger and such associated members.

The brake can now be released simply by the operator's removing cover 73 and the locking nut 72 at the end of screw 62, and turning nut 66 in a direction to retract the screw 62, that is, to produce axial movement of the screw to the left, viewing FIG. 2. It will be seen that after a relatively small amount of such movement of the screw 62 from the position shown in FIG. 2, the head 64 of the screw, engages the collar 60 on sleeve 56, and continued motion of screw 62 to the left carries with it the collar 60, the sleeve 56, plate 44, the plunger 36, the diaphragm 32 and plate 48, against the action of springs 50 and 52. Rearward movement of this unit is continued until the periphery of plate 48 strikes the wall 37 at 47, corresponding to the initial inoperative position of the diaphragm 32, shown in FIG. 1, and rotation of the nut 66 is then discontinued. At this point the screw has been fully retracted to the left, with the head 64 in the dotted line position shown in FIG. 1 at 64′.

Fluid pressure is again introduced via the passage 76 into the forward portion 43′ of the auxiliary chamber 26. The nut 66 is then rotated in the opposite direction to cause the screw 62 to move to the right as shown in FIG. 1, carrying head 64 away from the collar 60 toward the plate 44 to the position of the screw and head shown in full lines in FIG. 1. During such movement of the screw and head 64 to the right for resetting, the fluid pressure in 43′ maintains the diaphragm 32 in the position shown in FIG. 1, against the action of the springs 50 and 52. The device is now in the initial position shown in FIG. 1 wherein the auxiliary unit is in the inoperative condition.

It will be noted that the axial position of head 64 on the screw 62, with respect to the position of collar 60, can be adjusted to obtain a desired maximum degree of forward displacement of the plunger 36, e.g. shorter than that indicated in FIG. 2. Thus, screw 62 can be manipulated so that head 64 is reset at an intermediate position between its extreme positions shown in full and in dotted lines in FIG. 1. This will provide a shorter stroke for the plunger 36 and associated parts, than that illustrated in FIG. 2, as result of engagement of parts 62 and 64.

In FIG. 4 is shown a modification of the sleeve 56 and head 64 of FIGS. 1 to 3, to permit axial motion of the screw 62, while preventing rotation thereof. In the modification of FIG. 4, the sleeve 80, corresponding to sleeve 56, is of circular cross section, and in place of head 64, the screw 62 carries a key 82 which is adapted to slide in a longitudinally extending groove 84 formed along the inner surface of sleeve 80.

In FIG. 5 is shown a modified and simplified form of the safety brake mechanism of the invention. Numeral 109 represents the main air brake unit, in combination with the auxiliary brake mechanism 108 according to the invention. The brake unit 109 comprises an air brake cylinder 110 similar to cylinder 10 in FIG. 1, formed of two parts 111 and 112 clamped together by a band 114. In cylinder 110 is positioned a rubber diaphragm 113. Diaphragm 113 in its normal relaxed position shown in FIG. 5 contacts the forward portion 111′ of part 111. A brake rod 116 carries at its inner end a plate 115 which is connected to diaphragm 113 by screws 115′. The plate 115 and diaphragm 113 are normally urged to the left, as seen in FIG. 5, by means of a compression spring 120 which is seated at one end against the plate 115 and at the other end against the front wall (not shown) of the cylinder 110, as in FIG. 1. The brake rod 116 extends through the front wall (not shown) of the cylinder 110, as in FIG. 1. The brake rod 116 extends through the front wall (not shown) of the cylinder 110 and is connected in a conventional manner similar to that illustrated in FIG. 1, to a brake arm (not shown). Actuation of the brake is accomplished by introduction of fluid pressure through inlet 178 into the brake cylinder 110 behind diaphragm 113, causing displacement of the diaphragm 113 toward the front of the cylinder 110 against the action of compression spring 120, to apply the pressure needed to operate the brake through the brake rod 116.

The auxiliary unit 108 is in the form of a cylinder 126 comprising a front part 128 and a rear part 130. The parts 128 and 130 are flanged at 131 and clamp therebetween at its periphery a dished rubber diaphragm 132 by means of an annular band 133 crimped over the flange portions 131 of the cylinder parts. In the position of the diaphragm 132 shown in FIG. 5 the angular side 135 thereof is in abutting relation with a wall portion 137 of the cylinder part 130. Units 108 and 109 are integrally connected and separated by a wall 134.

The diaphragm 132 is mounted for axial displacement of a cylindrical plunger 136 in response to motion of such diaphragm, said plunger being mounted centrally on the axis of the diaphragm. The plunger 136 carries a rear integral flange 138, the central portion of diaphragm 132 being connected to plunger 136 by means of a countersunk screw 139 threadably engaging the plunger. The plunger 136 is mounted for reciprocable motion with the front end of such plunger received in a central passage or bearing 142 of the partition wall 134 between 108 and 109, an O-ring seal 141 being provided in the bearing 142. As seen in FIG. 5, the forward end of the plunger 136 extends just inside the rear of cylinder 110, and the end of the plunger carries a circular plate 144 mounted centrally on the plunger by means of a countersunk screw 148′. The plate 144 abuts the central portion of the diaphragm 113.

The rear part 130 of cylinder 126 carries a central cap 145, and a hollow guide member 140 extends inwardly from said cap into the rear part 130 to a distance short of diaphragm 132 in its relaxed position shown in FIG. 5. A central cylindrical follower 149 is received in slidable engagement in the central cylindrical bore 151 of the guide member 140, said follower carrying an integral plate 148 at its forward end. A pair of concentric compression springs 150 and 152 are positioned in the rear portion 130 of cylinder 126, between the rear wall 130′ of part 130 and plate 148, plate 148 carrying an integral flange 148' on its rear face, and rear part 130 carrying an internal flange 153 to maintain the springs properly centered. In the normal non-operative position of the auxiliary brake mechanism shown in FIG. 5, springs 150 and 152 are maintained under compression, forcing plate 148 against the rear of diaphragm 132, by fluid pressure within chamber 143' introduced therein via an inlet 176, and maintaining diaphragm 132 in the position shown in FIG. 5. Holes 154 are provided in the wall of part 130 to maintain the spring chamber 155 under ambient pressure.

Inlets 176 and 178 are connected to a common source of operating pressure. In the event of a failure of air pressure to inlets 176 and 178, springs 150 and 152 expand, forcing the plate 148, diaphragm 132, plunger 136 and plate 144 forward, that is, to the right viewing FIG. 5. During such movement, the follower 149 connected to plate 148 slides forward axially within the central bore 151 of the hollow guide member 140, and maintains the entire reciprocating unit, including plunger 136, plates 138 and 144, and diaphragm 132, in centered position throughout the period of axial motion of such unit, substantially without any lateral motion or vibration of the elements of such unit. The movement of plate 144 forward into the brake cylinder 110 urges the diaphragm 113 forward against the action of spring 120, thus forcing the brake rod 116 forward to apply the brakes. In the extreme forward position of diaphragm 132, shown in dotted lines in FIG. 5, the plunger flange 138 abuts the surface 160 of bearing 142.

When the operating air pressure is again built up to the normal value, the fluid pressure in chamber 143' forces the diaphragm 132 to the rear to its normal inoperative position shown in FIG. 5, against the action of springs 150 and 152, carrying with it as a unit the plunger 136, plates 138 and 144, plate 148, and plunger 149, the plate 148 abutting the forward end of fixed guide member 140 as shown in FIG. 5, when the diaphragm has returned to such inoperative position. During such return motion of the diaphragm, again the slidable axial movement of plunger 149 guided within the hollow guide member 140 maintains the diaphragm and its associated elements 136, 138, 144 and 148 in axially aligned position throughout such rearward motion.

When it is desired to disassemble parts 128 and 130, as for cleaning or repair purposes, a threaded bolt 162 shown in dotted lines in FIG. 5 can be inserted through a central aperture 164 in the end cap 145, and into engagement with internal threads 166 provided in the rear portion of a central bore 165 in follower 149. The bolt so engaged with the follower 149 will maintain this member including plate 148 in position against the action of springs 150 and 152, when the air pressure in chamber 143' is reduced to atmospheric pressure.

In FIG. 6, a mechanism is shown similar to that of FIG. 5, except that plate 138a carried on the rear of plunger 136, is of substantially larger diameter than plate 138 in the device of FIG. 5, and also plate 138a is not fastened to diaphragm 132. Experience has shown that even though plate 138a is not positively attached to diaphragm 132, in operation diaphragm 132 will usually tightly engage plate 138a both during forward motion of diaphragm 132 under the action of springs 150 and 152, and during rearward motion of diaphragm 132, produced by application of fluid pressure in chamber 143' against plate 138a.

It will also be seen that in the device of FIGS. 1 to 4, the plunger 36 is mounted directly on and itself cooperates with the axially positioned guide member 40 to maintain the plunger and the associated elements 32, 38, 44 and 48 in true axial alignment during reciprocation of these members, whereas in the device of FIGS. 5 and 6, the plunger 149 moving with the plunger 136 and indirectly connected thereto, cooperates with the axially positioned guide member 140 to maintain the plunger 136 and associated elements 132, 138, 144 and 148 in centered axial position during axial motion of such elements. However, since plunger 149 is indirectly connected to plunger 136 and moves therewith, plunger 149 which cooperates with the guide member 140, is considered, in the claims appended hereto, as a part of or as being associated with the plunger means.

If desired, follower plate 148 can be directly connected by any suitable fastener means to diaphragm 132 or to plunger 136.

In place of the diaphragm 32 or 132 I can employ an equivalent displaceable member such as a piston.

It will be understood that a brake unit of the type described above according to the invention, can be employed for each of the wheels of the vehicle.

It will be recognized that the safety mechanism of the invention, illustrated by the structural unit 8 or 108 of the drawings, can be employed in combination with any type of conventional fluid presure brake, a representative type being illustrated by unit 9 of the drawings. Thus, for example, the safety mechanism 8 or 108 of the invention can be employed in association with a conventional air brake unit employing a piston in place of the diaphragm 13 or 113 of the unit 9 or 109. Further, it will be understood that the unit 8 or 108 can be manufactured and sold as a separate unit for mounting in operative association with any type of conventional fluid pressure air brake, in a manner indicated in the drawings.

Although the auxiliary safety mechanism operates automatically in the event of a reduction in air pressure in the main brake cylinder, by further providing a separate hand valve in the vehicle cab for independently controlling the air pressure to the auxiliary chamber, e.g. 26, the driver of the vehicle can operate this valve at any time to vent the auxiliary chamber 26 so as to operate the auxiliary unit, for example, as a parking brake. This separate hand valve could also be operated to produce extra braking force in the event of low air pressure, and, of course, the device of the invention is particularly valuable in being fully automatic to apply full braking force in the event of a complete loss of air pressure. The invention structure especially permits quick and easy resetting of the auxiliary mechanism to its inoperative position following actuation of such mechanism.

While I have described particular embodiments of my invention, it should be understood that various modifications and adaptations thereof may be made within the spirit of the invention as set forth in the appended claims.

I claim:

1. A brake mechanism comprising a housing, a hollow guide member fixedly positioned axially in said housing, a dished rubber diaphragm having a central portion and angular side wall positioned in said housing and spaced axially from one end of said housing and peripherally connected in said housing, a pressure plate in said housing abutting the central portion of one side of said diaphragm, said hollow guide member connected to one end of said housing, a coil compression spring in said housing positioned about said guide member and positioned between said pressure plate and end of said housing, said spring biasing said pressure plate and diaphragm away from said one end, a hollow plunger connected to said pressure plate and centered in said housing by said guide member during axial reciprocation of said plunger, a fluid pressure connection to said housing on the other side of said diaphragm and bolt means accessible from the exterior of said housing, extending into said hollow plunger and axially movable in said hollow plunger for locking said plunger and said spring with the spring in compressed condition, a second housing mounted on said first named housing, a barrier wall between said first named housing and said second housing, a diaphragm in said second housing axially spaced from said barrier wall and connected at its periphery to said housing, a pressure plate mounted in said second housing abutting one side of said second diaphragm, a motion transmitting connection between said plunger and said last named pressure plate, and a fluid pressure connection to said second housing between said barrier wall and said last named pressure plate.

2. A brake mechanism of claim 1, said plunger being slidably positioned in said hollow guide member.

3. The brake mechanism of claim 1, said plunger being hollow and slidably positioned in said guide member, said guide member extending into said hollow plunger.

4. The brake mechanism of claim 1, said guide member being hollow and said plunger being slidably positioned in said hollow guide member.

5. The brake mechanism of claim 1, said plunger being hollow and said plunger being slidably positioned in said guide member, said guide member extending into said hollow plunger.

References Cited by the Examiner

UNITED STATES PATENTS

| | | | |
|---|---|---|---|
| 2,574,574 | 11/1951 | Ives | 92—101 |
| 2,608,211 | 8/1952 | Thornburn et al. | 92—101 |
| 2,992,630 | 7/1961 | Leighton et al. | 92—63 |
| 3,015,318 | 1/1962 | Mendes | 92—63 |
| 3,112,959 | 12/1963 | Kateley | 92—63 |

SAMUEL LEVINE, *Primary Examiner.*

RICHARD B. WILKINSON, *Examiner.*

H. G. SHIELDS, I. C. COHEN, *Assistant Examiners.*